United States Patent [19]

Durfee

[11] Patent Number: 4,922,599
[45] Date of Patent: May 8, 1990

[54] METHOD OF CONVERTING A FOUR SPEED MANUAL TRANSMISSION TO A FIVE SPEED TRANSMISSION

[76] Inventor: Mark Durfee, 206 N. Stevens St., Orange, Calif. 92668

[21] Appl. No.: 294,684

[22] Filed: Jan. 9, 1989

[51] Int. Cl.[5] .................. B21K 21/16; B23P 17/04; B23P 23/00
[52] U.S. Cl. ................... 29/401.1; 29/426.5; 29/434; 29/445; 74/363; 74/606 R
[58] Field of Search ............ 29/401.1, 434, 426.5, 29/445; 74/665 T, 740, 745, 606 R, 363

[56] References Cited

U.S. PATENT DOCUMENTS

| | | | |
|---|---|---|---|
| 3,465,613 | 9/1969 | Henry-Biabaud | 74/606 R |
| 4,333,358 | 6/1982 | Grattapaglia | 74/606 R X |
| 4,499,791 | 2/1985 | Brisabois | 29/401.1 X |
| 4,539,865 | 9/1985 | Yoneda et al. | 74/606 R |
| 4,597,312 | 7/1986 | Hicks et al. | 29/401.1 X |
| 4,602,519 | 7/1986 | Atkins et al. | 29/401.1 X |
| 4,682,516 | 7/1987 | Okubo | 74/665 T X |
| 4,793,213 | 12/1988 | Nishimura | 74/606 R X |
| 4,798,103 | 1/1980 | Eastman | 74/740 |

*Primary Examiner*—Charlie T. Moon
*Attorney, Agent, or Firm*—Edgar W. Averill, Jr.

[57] ABSTRACT

An improved transmission for a Volkswagen brand of automobile which has five forward speeds rather than the stock four forward speeds. The transmission uses the vast majority of the parts of the four speed transmission but modifies the four speed transmission by extending the main shaft and the pinion shaft by threading shaft extensions onto the end of both of these shafts. In addition, a new gear carrier housing of greater length and a new nose cone of shorther length are substituted for the original gear carrier housing and nose cone. The method of making this conversion is also described.

3 Claims, 3 Drawing Sheets

METHOD OF CONVERTING A FOUR SPEED MANUAL TRANSMISSION TO A FIVE SPEED TRANSMISSION

BACKGROUND OF THE INVENTION

The field of the invention is automotive transmissions and the invention relates more particularly to the conversion of a Volkswagen brand four speed manual transmission to a five speed manual transmission. The air-cooled Volkswagen automobile was made for many years and a large number of the original automobiles are still being used by Volkswagen enthusiasts. These original automobiles are being fitted with more powerful, better cooled engines, safer braking systems and more elaborate interiors. With improved highway construction and the increased interset in off-road use, the original four speed transmission has been found deficient. Various attempts have been made to modify the four speed transmission and some attempts have gone so far as to place a Porsche brand of transmission into the original Volkswagen. This, however, requires modification of the pan and frame horns and special motor mounts had to be fabricated. The Porsche transmission is very expensive and such conversion was economically unfeasible for all but the most rapid enthusiast. Another approach was locating a fifth gear outside of the original transmission case, but this, of course, led to numerous additional problems and to date, no one has been successful in providing an economical way to convert the original four speed transmission to a five speed transmission.

SUMMARY OF THE INVENTION

It is an object of the present invention to provide a method and apparatus for converting a Volkswagen brand of four speed transmission to a five speed transmission when the four speed transmission is of the type which has a main shaft and a pinion shaft which are threaded at their external ends.

The present invention is for an improved transmission for a Volkswagen brand of automobile. The improved transmission is a five speed transmission converted from an original four speed transmission. The original four speed transmission is of the type including the main shaft having a threaded end, a pinion shaft having a threaded end, a gear carrier housing and a nose cone. The improvement comprises a main shaft extension shaft affixed to the threaded end of the original four speed transmission main shaft. The main shaft extension shaft has a main shaft connecting end and an external end and has a female thread near the main shaft connecting end and a male thread on the external end and a key way formed longitudinally in the outer surface of the main shaft extension shaft. A pinion shaft extension shaft is threaded onto the threaded end of the original pinion shaft. The pinion shaft extension shaft has a pinion shaft connecting end and an external end and has a female thread near the pinion shaft connecting end and a male thread at the external end. A gear carrier housing having a transmission case end bolted to the transmission case and having a nose cone end bolted to the nose cone has a housing length between the transmission case and the nose cone end, and the housing length is greater than the housing length of the original gear carrier housing. A nose cone has a gear carrier housing end bolted to the gear carrier housing and an external end. The nose cone has a nose cone length which is shorter than the nose cone length of the original nose cone, and the sum of the gear carrier housing length and the nose cone length equals the sum of the original gear carrier housing length plus the original nose cone length. A fifth gear is held by the pinion shaft adjacent the original fourth gear, and a fifth gear is held by the main shaft adjacent the original fourth gear. A fifth slider is mounted on the main shaft extension shaft over the keyway therein and adjacent the fifth gear. Preferably, a thrust washer is mounted between the fifth slider and the inner surface of the gear carrier housing of the nose cone end thereof. The pinion shaft extension shaft is preferably secured to the threaded end of the pinion shaft by a lock pin which is preferably inserted through a hole drilled through the threaded end of the pinion shaft. An improved fourth-fifth key is held by the original fourth keyway in the pinion shaft and extends toward the end of the pinion shaft and under the new fifth gear thereon.

DESCRIPTION OF THE PREFERRED EMBODIMENTS

Figure 1:
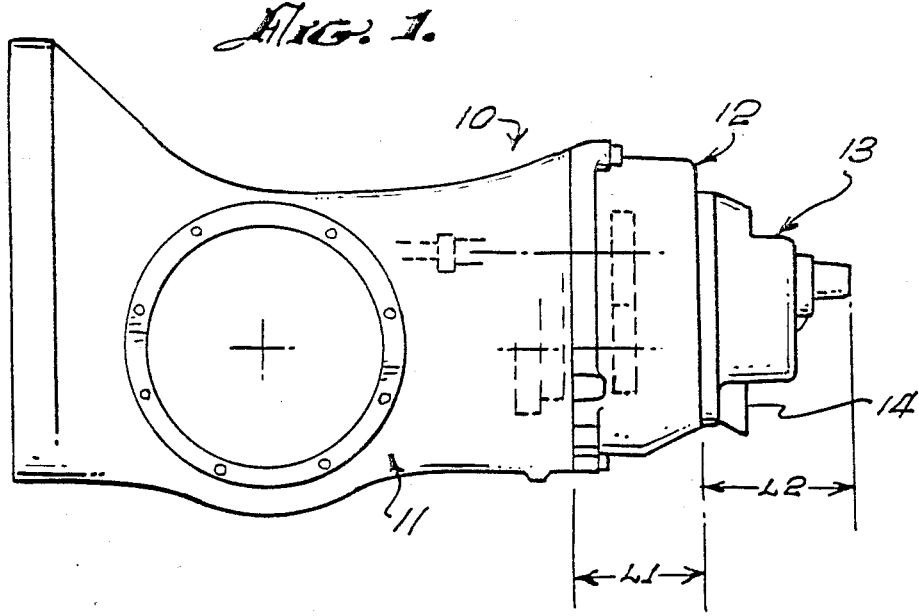
FIG. 1 is a side view of the exterior of a conventional Volkswagen four speed transmission.

A conventional Volkswagen transmission of the type used in air-cooled Volkswagen automobiles until 1967 is shown in FIG. 1 and indicated generally by reference character 10. Transmission 10 has a transmission case 11 to which a gear carrier housing 12 is a bolted. A nose cone 13 is bolted to gear carrier housing 12. The length of gear carrier housing 12 is indicated by "L1" in FIG. 1 and the length of nose cone 13 is indicted by "L2." Transmission 10 is supported by a transmount which is affixed at reference character 14 in FIG. 1.

Figure 2:
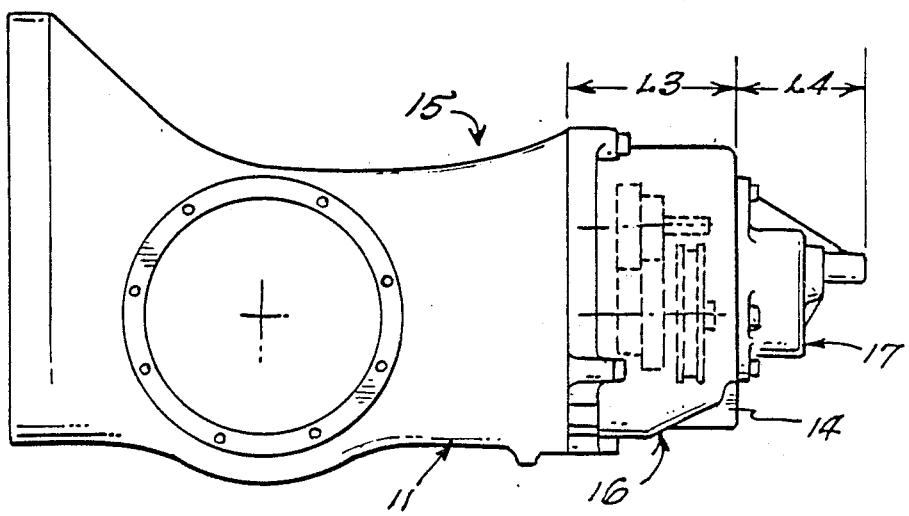
FIG. 2 is a side view of the improved five speed transmission of the present invention.

A major difficulty with prior art attempts to add a fifth gear to this type of transmission has been the limited space with gear carrier housing 12 which simply does not have room within it for such addition. The solution to this problem is indicated in FIG. 2 where the transmission of the present invention is indicated by reference character 15. Transmission 15 has the same transmission case 11 but a new gear carrier housing 16 which has a length L3 and a new nose cone 17 which has a length L4. The gear carrier housing length L3 is greater than the length L1 of gear carrier housing 12 which thereby permits room for an additional gear. In order to permit using the same mounting location 14, the sum of L3 plus L4 is the same as the sum of L1 plus L2. Thus, the transmission can be mounted in the same manner and it is only necessary to provide a new gear carrier housing and a new nose cone to provide sufficient space within the transmission case.

Figure 4:
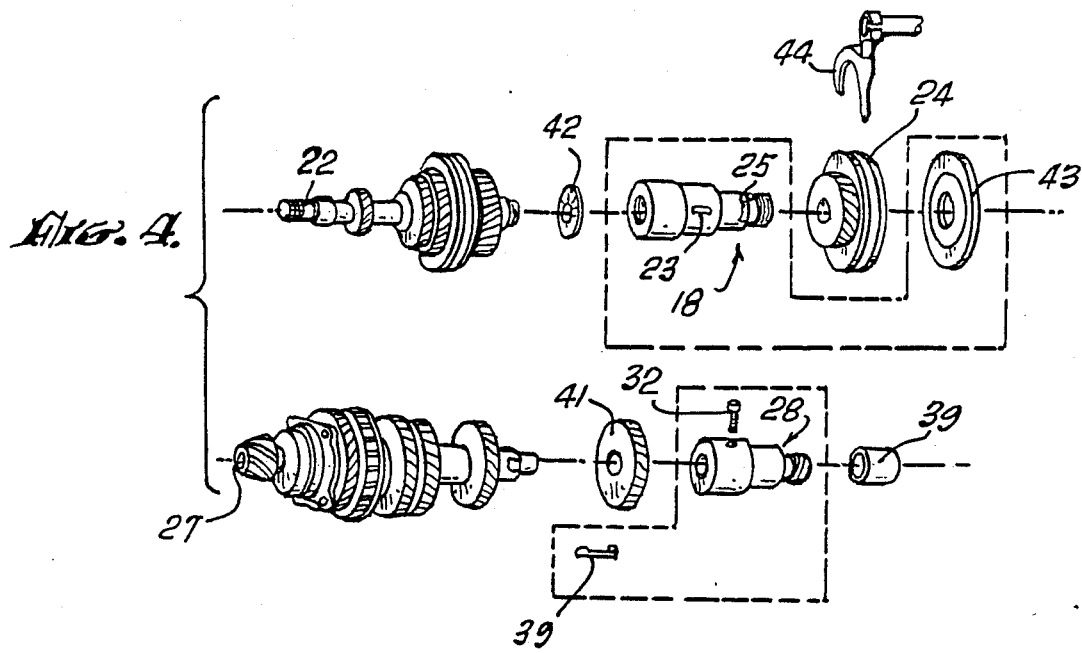
FIG. 4 is an exploded, perspective view of the main shaft and pinion shaft of the transmission of FIG. 2.
Figure 5:
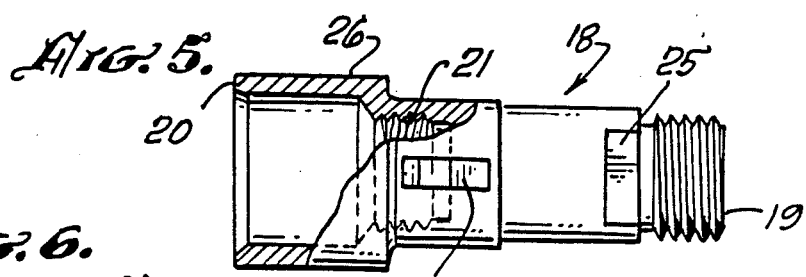
FIG. 5 is an enlarged side view, partly in cross section, of the main shaft extension shaft of the transmission of FIG. 2.
Figure 6:
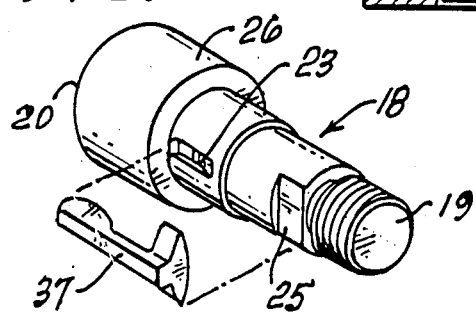
FIG. 6 is a perspective view of the main shaft extension shaft of the transmission of FIG. 2.

The particular means used to lengthen the main shaft and the pinion shaft is shown best in FIGS. 5 through 8. In FIGS. 5 and 6, a main shaft extension shaft 18 is shown. Main shaft extension shaft 18 has an external end 19 and a main shaft connecting end 20 near which a set of female threads 21 is located. The main shaft (shown schematically in FIG. 4 and indicated by reference character 22) has a threaded exterior end to which the main shaft extension shaft 18 is screwed onto. Because of the direction of rotation of the main shaft. there is no tendency for extension 18 to loosen during use. However, it is appropriate to use Blue Locktight and torque the main shaft extension to about 60 foot pounds to help assure that there is no looseness. Main shaft extension shaft 18 has a keyway 23 which secures a slider 24 shown in FIG. 4. Main shaft extension shaft 18 also has a flat 25 which is used to assist in tightening the shaft 18 onto the main shaft 22. The main shaft connecting end 20 has a smooth outer surface 26 which supports a needle bearing upon which fifth gear rides.

Figure 7:
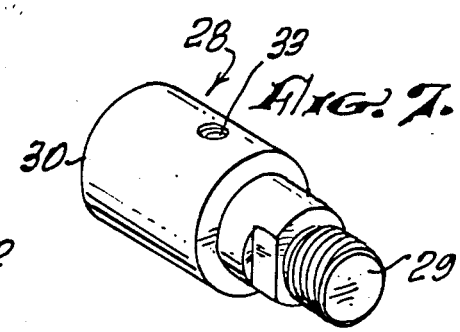
FIG. 7 is a perspective view of the pinion shaft extension shaft of the transmission of FIG. 2.
Figure 8:
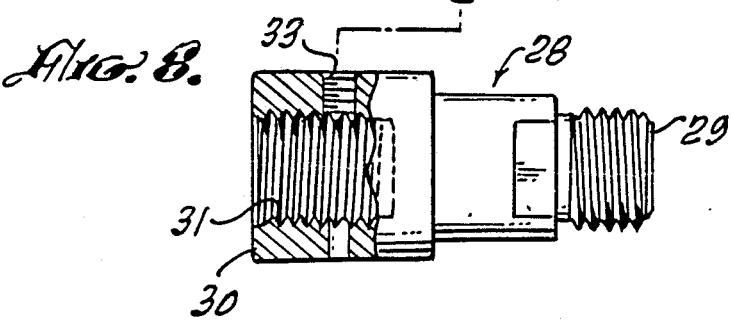
FIG. 8 is a side view partly cut away of the pinion shaft extension shaft of the transmission of FIG. 2.

The pinion shaft 27, shown in FIG. 4, is also extended by threading an extension thereon. Such extension is shown in FIGS. 7 and 8 where the pinion shaft extension shaft is indicated by reference character 28. Shaft 28 has an external end 29 and a pinion shaft connecting end 30 which has a set of female threads 31. A lock pin 32 is threaded into opening 33, and the pin portion thereof passes through a hole drilled through the threaded end of pinion shaft 27. Locktight and a tightening torque of 60 pounds is also used prior to the insertion of lock pin 32 to help assure that shaft 28 remains secured to the end of pinion shaft 27.

In order to convert a standard four speed transmission, the four speed transmission is completely disassembled and the old reverse selector shaft is installed in gear carrier housing 16. The pinion bearing from the old assembly is installed in gar carrier housing 16 and the fourth gears removed from the pinion shaft. The fourth gear key is also removed and saved for later use on the main shaft addition. A new fourth and fifth gear key is installed in the keyway in the pinion shaft at the location where fourth gear had formerly been secured. Fourth gear is heated and reinstalled on the pinion shaft and a new fifth gear is also heated and installed on the pinion shaft over key 37. The threaded end of the old pinion shaft is coated with Locktight, and the pinion shaft extension shaft 28 is tightened onto the end of the pinion shaft and torqued down to 60 pounds. A hole is then drilled through opening 33 into and through the threaded end of the old pinion shaft, and lock pin 32 is secured in threaded opening 33 with Locktight to secure it in place. A bearing race 39 is heated and reinstalled on the pinion shaft addition over the narrowed portion indicated by reference character 38.

Next, the main shaft is extended by coating the threaded end of the main shaft 22 with Locktight and threading the main shaft extension shaft 18 thereon. This is also torqued down to 60 foot pounds although because of the direction of rotation, there is no likelihood that this will ever become loose. Next, the fifth gear bearing is placed over needle bearing surface 26, and the desired fifth gear 41 is placed over the bearing, not shown. It should be noted that the original thrust washer 42 remains between the end of the old main shaft 22 and the main shaft extension shaft 18. The key, which was formerly under fourth gear on the pinion shaft, is then installed in the keyway 23 of main shaft extension shaft 18, and a stock Volkswagen third and fourth gear slider with third gear side facing fifth gear is placed over keyway 23. A new thrust washer 43. shown in FIG. 4, is then placed adjacent the new fifth slide.

Figure 3:
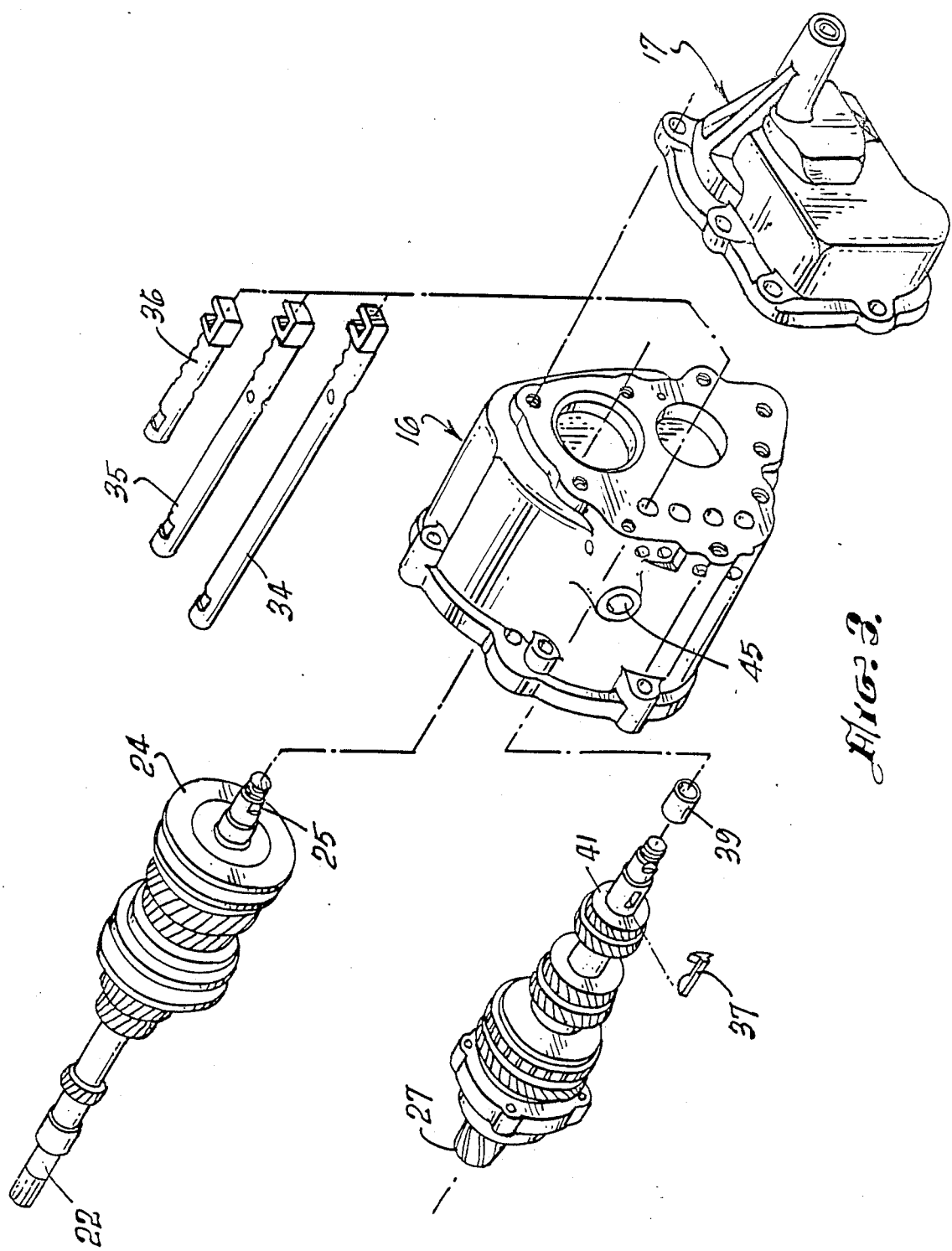
FIG. 3 is an exploded, perspective view of the improved transmission of FIG. 2.

Next, the main shaft and pinion shaft are installed in the new gear carrier housing 16. After standing the pinion shaft assembly up on the left and standing the main shaft assembly up on the right, the fifth gear fork 44 is installed on the slider. The fifth gear selector 36 is removed just enough to be flush with the inside housing. Next, the gear carrier housing 16 is installed over the pinion and main shaft assemblies, making sure that the fifth gear selector shaft slides in the fifth gear fork hold. The main shaft bearing is installed and the nuts are torqued and the fifth gear allen bolt is installed. Next, the remaining shift forks are installed and the gears are adjusted using a conventional transmission jake adjustment. The fifth gear adjustment plug is inserted in opening 45 in the side of gear housing 16 (shown in FIG. 3). A new shifter plate is also supplied with the kit. Lastly, the nose cone is installed after shortening the "hockey stick" by cutting two inches from the coupler end.

The resulting modified transmission shifts flawlessly through the gears and permits superior off-road performance. Because the modified main shaft and pinion shaft are supported at both ends, the modified transmission provides full strength and reliability. The purchaser can choose the gear ratios appropriate for the intended use of the vehicle and stock Volkswagen gears may be used.

The resulting kit uses a minimum of new parts and a maximum of off-the-shelf volkswagen parts which reduces cost and provides parts with a long history of successful use.

The present embodiments of this invention are thus to be considered in all respects as illustrative and not restrictive; the scope of the invention being indicated by the appended claims rather than by the foregoing description. All changes which comes within the meaning and range of equivalency of the claims are intended to be embraced therein.

What is claimed is:

1. A method for converting a four speed transmission of a Volkswagen brand of automobile to a five speed transmission, wherein the four speed transmission is of the type having a threaded end on the pinion shaft and the main shaft, and the four speed transmission has a gear carrier housing and a nose cone of a first total length wherein the method comprises the steps of:
   disassembling the original four speed transmission including the steps of removing the original gear carrier housing and original nose cone;
   bolting a new gear carrier housing having a longer length than the original gear carrier housing onto the original transmission case;
   removing the fourth gear from the pinion shaft;
   remove the original fourth gear key from the pinion shaft;
   install a new fourth-fifth gear key into the original keyway on the pinion shaft;
   reinstall the original fourth gear over the fourth-fifth key on the pinion shaft;
   install a fifth gear on the pinion shaft;
   screw on a pinion shaft extension shaft on the threaded end of the pinion shaft;
   screw on a main shaft extension shaft on the threaded end of the main shaft;

install a fifth gear bearing and a fifth gear on the main shaft extension shaft;

install a fifth gear slider onto the main shaft adjacent the fifth gear;

install a thrust washer adjacent the fifth gear slider;

install a gear carrier housing having a length greater than the original gear carrier housing over the ends of the mains shaft and pinion shaft and bolt the housing to the transmission case;

install all shift forks;

adjust all gears; and install a new nose cone having a shorter length than the original nose cone but having a length sufficient so that the total length of the new nose cone and new gear carrier housing equals the length of the old nose cone and old gear carrier housing.

2. The method of claim 1 further including the step of securing the pinion shaft addition to the pinion shaft by drilling a hole through the threaded end of the pinion shaft and inserting a lock pin through the pinion shaft extension shaft and through the hole in the threaded end of the pinion shaft.

3. A method of converting a four speed transmission to a five speed transmission when the four speed transmission has main and pinion shafts having threaded ends and when the four speed transmission has a gear carrier housing and a nose cone, said method comprising the steps of:

removing and discarding the original gear carrier housing and nose cones;

screwing threaded shaft extensions onto the end of the main shaft and the pinion shaft;

placing a fifth gear on the end of the pinion shaft;

placing a fifth gear and slider on the end of the main shaft;

placing a gear carrier housing having a greater length than the original gear carrier housing over the main and pinion shaft ends and securing the gear carrier housing to the transmission case; and securing a nose cone to the gear carrier housing, the nose cone having a length shorter than the original nose cone an amount equal to the length that the original gear carrier housing is to the new gear carrier housing.

* * * * *